United States Patent Office 3,580,914
Patented May 25, 1971

3,580,914
DERIVATIVES OF N-METHYLPIPERAZINE
Andrea Pedrazzoli and Leon Dall'Asta, Milan, Italy, assignors to Societe d'Etudes de Recherches et d'Application Scientifiques et Medicales E.R.A.S.M.E., Paris, France
No Drawing. Filed Aug. 14, 1967, Ser. No. 660,227
Claims priority, application Great Britain, Aug. 23, 1966, 37,827/67
Int. Cl. C07d 51/64
U.S. Cl. 260—268                         2 Claims

ABSTRACT OF THE DISCLOSURE

N-methyl-N'-ethyl-piperazines in which the ethyl radical is $\beta,\beta$-disubstituted with (1) a phenyl or phenoxymethylene radical which is unsubstituted or substituted in the ring with straight or branched aliphatic chains having 4 to 12 carbon atoms or cycloalkyl groups having 5 to 6 carbon atoms or with 2 or 3 chlorine atoms or with 2 chlorine atoms and a nitro group, and (2) a benzoyloxy or phenoxyacetyloxy radical which is unsubstituted or substituted in the ring with 1, 2 or 3 chlorine atoms or with 2 chlorine atoms and a nitro group or a benzyloxy radical substituted in the ring with 1, 2 or 3 chlorine atoms; and pharmaceutically acceptable acid addition salts thereof. All of the compounds have antibacterial and antiprotozoan activity.

The present invention relates to new derivatives of N-methylpiperazine, which are therapeutically useful, and their process of preparation; the new products of the invention have the general structural formula:

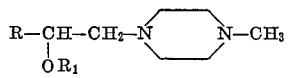

in which:

R is a phenyl or phenoxymethylene radical substituted in the ring with straight or branched aliphatic chains having 4 to 12 carbon atoms, with cycloalkyl groups having 5 or 6 carbon atoms, with two or three chlorine atoms or with two chlorine atoms and one nitro group;

$R_1$ is a benzoyl or phenoxyacetyl radical unstubstited or substituted in the ring with one, two or three chlorine atoms or with two chlorine atoms and one nitro group or a benzyl radical substituted in the ring with one, two or three atoms of chlorine.

The process of preparation of the compounds according to the invention can be represented by the following reaction scheme:

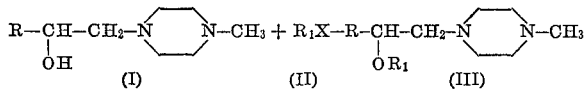

in which X represents a halogen atom and R and $R_1$ have the same meanings as above.

The compounds of the invention where $R_1$ is the radical of an acid are obtained by the reaction of the amino alcohol (I) with an acid halide $R_1X$, preferably an acid chloride, in an inorganic solvent such as benzene, toluene, xylene or tetrahydrofuran, in the presence of a basic hydrogen acceptor, such as the tertiary amines, e.g. triethylamine, pyridine or dimethylaniline, to give the corresponding ester (III).

The reaction takes place at room temperature and, in order to complete it, it is preferable to heat the mixture under reflux for some hours.

The compounds of the invention, where $R_1$ is a substituted benzyl, are obtained by reaction of the amino alcohol with the halide of a substituted benzyl, in an inert organic solvent such as benzene, toluene, xylene or tetrahydrofuran, in the presence of an alkali metal or alkaline earth metal hydride, preferably sodium hydride.

The reaction takes place at a temperature of 70°–145° C., preferably 110°–120° C., for 5–20 hours, preferably for 15–19 hours.

The products of the invention are separated in the form of salts with pharmaceutically useful inorganic or organic acids, such as the hydrochloride, sulphate, phosphate, or citrate.

The starting materials are obtained by the following procedures:

(a) In the case where R is a substituted phenyl radical as indicated above, the $\omega$-halo-ketone (IV) is reacted with N-methylpiperazine according to known techniques and the product obtained (V) is reduced with sodium borohydride to give the desired intermediate (VI):

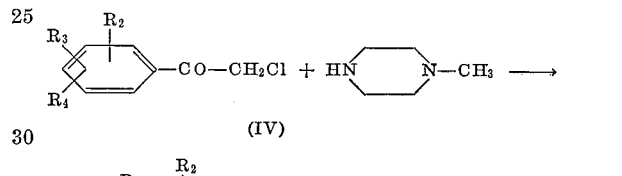

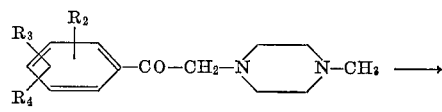

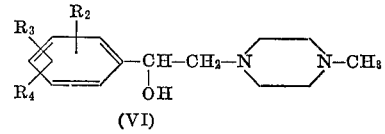

where $R_2$, $R_3$ and $R_4$ can be the same or different and each represents a straight or branched aliphatic chain containing 4 to 12 carbon atoms or a cycloaliphatic ring containing 5 or 6 carbon atoms or chlorine;

(b) In the case where R is a substituted phenoxy-methylene, the epoxide (VII) is reacted with N-methyl-piperazine to give the desired intermediate (VIII):

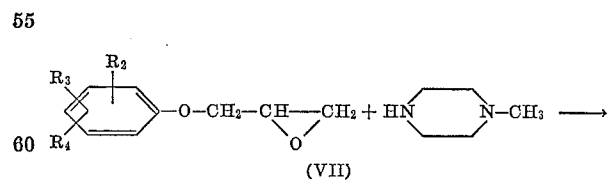

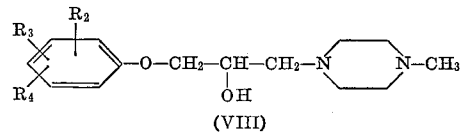

where $R_2$, $R_3$ and $R_4$ can be the same or different and have the meaning defined above in (a).

The compound (VIII) can also be synthesized by the reaction:

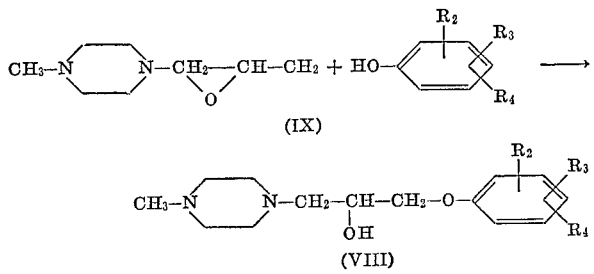

In this case, the 1-(2',3'-epoxypropyl)-4-methyl-piperazine (IX) is reacted according to known techniques with an aqueous alkaline solution of the phenate.

All the products of the invention have a remarkable antibacterial activity, their spectrum extending both to Gram-positive and Gram-negative organisms; also, they have a clear action on *Candida albicans* and on other mycetes.

The compounds of the invention also have a marked antiprotozoan activity, especially trichomoricidal and amibicidal, at low concentration.

The cytostatic activty "in vitro" and "in vivo" is also notable.

Nearly all the compounds of the invention have a low acute toxicity, are well tolerated in animals and exhibit no toxic manifestations, following prolonged administration.

The following examples illustrate the invention without limiting it.

EXAMPLE 1

1-[β-(2',4''-dichlorobenzoyloxy)β-(3',4'-dichlorophenyl)-ethyl]-4-methyl-piperazine dihydrochloride 89.2 g. of 3,4,ω-trichloroacetophenone in 240 ml. of anhydrous ethyl ether were treated for 10 minutes with a solution of 84 g. of N-methyl-piperazine in 160 ml. of anhydrous ethyl ether. After 3 hours of agitation at room temperature, the solution was filtered and concentrated under vacuum and, by crystallization of the residue from isopropanol and petroleum ether, 40.8 g. of 3,4-dichloro-ω-(4'-methylpiperazin - 1'-yl)-acetophenone was obtained; M.P.=76°–78° C.

40.8 g. of 3,4 - dichloro-ω-(4'-methylpiperazin-1'-yl)-acetophenone in 150 ml. of methanol were treated at 18°–20° C. for 15 minutes with a solution of 4.65 g. of sodium borohydride in 10 ml. of NaOH+25 ml. of water. After 30 minutes of agitation, the mixture was filtered and from the solution, by dilution with 150 ml. of water, 39 g. of 1 - (3',4' - dichlorophenyl) - 2 - (4'' - methylpiperazin-1''-yl)-ethan-1-ol was obtained; M.P.=121°–123° C.

To 39 g. of 1-(3',4'-dichlorophenyl)-2-(4''-methylpiperazin-1''-yl)-ethan-1-ol in 530 ml. of toluene, 28.8 g. of 2,4-dichlorobenzoyl chloride in 55 ml. of anhydrous toluene were added and then 14.1 g. of triethylamine in 110 ml. of anhydrous toluene. After heating under reflux for 2 hours, the mixture was cooled, filtered and concentrated under vacuum and the residue was treated with a solution of hydrochloric acid in isopropanol to obtain 53.6 g. of crude product. After two crystallizations from 95% ethanol, 47 g. of 1-[β-(2'',4''-dichlorobenzoyl)β-(3',4'-dichlorophenyl)-ethyl]-4-methyl-piperazine dihydrochloride was obtained; M.P.=209°–212° C.

EXAMPLE 2

1 - (2',4',6'-trichloro-phenoxy)-2-(2'',4''-dichloro-benzoyloxy)-3-(4'''-methyl-piperazine-1'''-yl)-propane dihydrochloride 1-(2',4',6'-trichlorophenoxy)-2-3-epoxypropane was obtained in the following manner:

49 g. of 2,4,6-trichlorophenol and then 26 g. of epichlorhydrin were added to a solution of 16.2 g. of 85% KOH in 250 ml. of water. After agitation for 3 hours at room temperature, the mass was extracted with 150 ml. of ethyl ether. From the ethereal solution, 29.2 g. of 1-(2',4',6'-trichlorophenoxy)-2,3-epoxypropane were obtained. A solution of 29.2 g. of 1-(2',4',6'-trichlorophenoxy)-2,3-epoxypropane+11.5 g. of N-methyl-piperazine in 88 ml. of absolute alcohol were heated under reflux for 2 hours. After concentration under vacuum, the residual oil was treated with a solution of hydrochloric acid in isopropanol to obtain 49 g. of crude product. By crystallization from isopropanol, 37.1 g. of 1-(2',4',6'-trichlorophenoxy)-3-(4''-methylpiperazin-1''-yl)-propan-2-ol dihydrochloride were obtained; M.P.=218°–220° C.

37.1 g. of 1-(2',4',6'-trichlorophenoxy)-3-(4''-methyl-piperazin-1''-yl)propan-2-ol dihydrochloride in 800 ml. of anhydrous benzene were treated with 21.7 g. of 2,4-dichlorobenzoyl chloride and then 20.85 g. of triethylamine dissolved in 120 ml. of anhydrous benzene were added. The mixture was heated under reflux for 2 hours, filtered and then the benzene solution was washed with water. After drying, the hydrochloride was precipitated with a solution of hydrochloric acid in isopropanol. After crystallization of the crude product from ethanol, 49 g. of 1-(2',4',6'-trichlorophenoxy) - 2 - (2'',4''-dichlorobenzoyloxy)-3-(5'''-methylpiperazin-1'''-yl)-propane dihydrochloride were obtained; M.P.=216°–218° C.

EXAMPLE 3

1 - (2',4',6'-trichlorophenoxy)-2-(2'',4''-dichlorobenzoyloxy)-3-(4'''-methylpiperazin-1'''-yl) - propane dihydrochloride 46.8 g. of 1-(2',3'-epoxypropyl) - 4 - methylpiperazine were introduced at room temperature into a solution of 59.2 g. of 2,4,6-trichlorophenol in 19.2 g. of 85% KOH+300 ml. of water. After agitation for 8 hours, the mass was extracted with 200 ml. of methylene chloride. The oil obtained by concentration of the solution was dissolved in isopropanol and treated with a solution of a hydrochloric acid in isopropanol to give 56 g. of crude product. After crystallization from isopropanol, 43.5 g. of 1-(2',4',6'-trichlorophenoxy) - 3 - (4''-methylpiperazin-1'' - yl) - propan - 2 - ol dihydrochloride were obtained; M.P.=218°–220° C. The preparation then continued as indicated in Example 2.

EXAMPLE 4

N-methyl-N'-[β-(4-chlorobenzyloxy)-β-(4'-cyclopentyl-phenyl)-ethyl]-piperazine dihydrochloride A mixture of 28.8 g. (10.1 moles) of N-methyl-N'-[β-hydroxy-β-(4-cyclopentyl-phenyl)-ethyl]-piperazine, 5.3 g. (0.11 mole) of sodium hydride in 50 p. 100 oily suspension and 300 ml. of anhydrous toluene was heated at 120° C. for 1 hour. The mixture was cooled to 50° C. and treated with a solution of 17.7 g. (0.11 mole) of p-chlorobenzyl chloride in 50 ml. of anhydrous toluene.

The mixture was heated under reflux for 16 hours, then cooled and treated with 350 g. of ice and the aqueous solution was separated and rewashed with water.

The organic phase was extracted with 300 ml. of 2 N HCl. The acidic solution rendered alkaline with 40% NaOH was extracted with ethyl ether. The concentrated and dried ethereal extract gave 35 g. of dense oil.

The oil dissolved in isopropanol and acidified with HCl gave 21 g. of crystals which were recrystallized from a 3.2 mixture of isopropanol and ethanol to give 17 g. of product having a melting point=223°–225° C.

From the concentrated combined mother liquors, another 5.3 g. of product having a melting point=222°–224° C. was obtained.

EXAMPLE 5

N-methyl-N'-[β-(trichloro-2,4,5-benzyloxy)-β-(dichloro-3',4'-phenyl)-ethyl]-piperazine dihydrochloride A mixture of 23 g. (0.1 mole) of N-methyl-N'-[β-hydroxy-β-(dichloro-3,4-phenyl)ethyl]-piperazine, 4.8 g. of sodium hydride in 50% oily suspension and 250 ml. of anhydrous toluene was heated at 120° C. for 1 hour. The mixture was cooled to 50° C. and treated with a solution of 23 g. (0.1 mole) of trichloro-2,4,5-benzyl-chloride in 40 ml. of anhydrous toluene. The mixture was again heated to 120° C. for 18 hours and then cooled and treated with 300 g. of ice, the aqueous solution being separated and rewashed with water. The organic phase was extracted with 350 ml. of 2 N HCl. From this acidic solution, by alkalinisation with 40% NaOH and extraction with 300 ml. of ethyl ether, an ethereal solution of the base was obtained which, with HCl, gave 26 g. of crude product. After crystallization from ethyl acetate+isopropanol, 17.5 was obtained having a melting point=204°–208° C.

Various products according to the invention, prepared by the reaction schemes set out above, are included in the following table.

TABLE $$R-\underset{\underset{R_1}{O}}{CH}-CH_2-N\diagup\diagdown N-CH_3$$

| Compound Number | R | $R_1$ | Formula of product obtained | Melting point (° C.) |
|---|---|---|---|---|
| 1 | 4-(tert-butyl)phenyl— (CH$_3$)$_3$C—C$_6$H$_4$— | 4-chlorobenzoyl Cl—C$_6$H$_4$—CO— | $C_{24}H_{30}Cl_2N_2O_2 \cdot 2HCl$ | 207–208 |
| 2 | CH$_3$—(CH$_2$)$_5$—C$_6$H$_4$— | Same as above | $C_{26}H_{34}Cl_2N_2O_2 \cdot 2HCl$ | 185.5–187 |
| 3 | cyclopentyl-C$_6$H$_4$— | ....do.... | $C_{25}H_{30}Cl_2N_2O_3 \cdot 2HCl$ | 203–206 |
| 4 | Same as above | 2,6-dichlorophenoxyacetyl Cl$_2$C$_6$H$_3$—O—CH$_2$—CO— | $C_{26}H_{31}Cl_3N_2O_3 \cdot 2HCl$ | 212–214 |
| 5 | 3,4-dichlorophenyl Cl$_2$C$_6$H$_3$— | 2-chlorobenzoyl Cl—C$_6$H$_4$—CO— | $C_{20}H_{21}Cl_3N_2O_2 \cdot 2HCl$ [a] | 215–217 |
| 6 | Same as above | 3-chlorobenzoyl Cl—C$_6$H$_4$—CO— | Same as above | 230–232 |
| 7 | ....do.... | 4-chlorobenzoyl Cl—C$_6$H$_4$—CO— | ....do [a].... | 245–247 |
| 8 | ....do.... | 2,4-dichlorobenzoyl Cl$_2$—C$_6$H$_3$—CO— | $C_{20}H_{20}Cl_4N_2O_2 \cdot 2HCl$ | 210–212 |
| 9 | ....do.... | 2,4,6-trichlorobenzoyl Cl$_3$—C$_6$H$_2$—CO— | $C_{20}H_{19}Cl_5N_2O_2 \cdot 2HCl$ | 209–211 |
| 10 | 2,4,6-trichlorophenoxymethyl Cl$_3$C$_6$H$_2$—O—CH$_2$— | 2,4-dichlorobenzoyl Cl$_2$—C$_6$H$_3$—CO— | $C_{21}H_{21}Cl_5N_2O_3 \cdot 2HCl$ | 224–226 |
| 11 | 2,4,6-trichlorophenoxymethyl Cl$_3$C$_6$H$_2$—O—CH$_2$— | 2,6-dichlorophenoxyacetyl Cl$_2$C$_6$H$_3$—O—CH$_2$—CO— | $C_{22}H_{22}Cl_6N_2O_4 \cdot 2HCl$ | 215–218 |
| 12 | 4-chlorophenyl Cl—C$_6$H$_4$— | 2,6-dichloro-4-nitrophenoxyacetyl O$_2$N—C$_6$H$_2$Cl$_2$—O—CH$_2$—CO— | $C_{21}H_{21}Cl_4N_3O_5 \cdot 2HCl$ | 222–224.5 |
| 13 | Same as above | 4-chlorobenzyl Cl—C$_6$H$_4$—CH$_2$— | $C_{20}H_{23}Cl_3N_2O \cdot 2HCl$ | 240–243 |
| 14 | ....do.... | 2,4-dichlorobenzyl Cl$_2$—C$_6$H$_3$—CH$_2$— | $C_{20}H_{22}Cl_4N_2O \cdot 2HCl$ | 237–240 |

TABLE—Continued

| Compound Number | R | R₁ | Formula of product obtained | Melting point (° C.) |
|---|---|---|---|---|
| 15 | ___do___ | 2,3,4-trichlorobenzyl (Cl, Cl, Cl-C₆H₂-CH₂-) | $C_{20}H_{21}Cl_5N_2O \cdot 2HCl$ | 204–208 |
| 16 | cyclopentyl-phenyl | 4-chlorobenzyl (Cl-C₆H₄-CH₂-) | $C_{25}H_{33}ClN_2O \cdot 2HCl$ | 223–225 |
| 17 | Same as above | 2,3,4-trichlorobenzyl | $C_{25}H_{31}Cl_3N_2O \cdot 2HCl$ | 227–229 |
| 18 | $CH_3(CH_2)_5$-C₆H₄- | 4-chlorobenzyl | $C_{26}H_{36}Cl_2N_2O \cdot 2HCl$ | [b] 215–219 |
| 19 | Same as above | 2,3,4-trichlorobenzyl | $C_{26}H_{35}Cl_3N_2O \cdot 2HCl$ | [b] 195–199 |
| 20 | 2,4,6-trichlorophenoxymethylene (Cl, Cl, Cl-C₆H₂-O-CH₂-) | 4-chlorobenzyl | $C_{21}H_{24}Cl_4N_2O_2 \cdot HCl$ | 95–96.5 |

[a] Crystallised with ½ molecule of ethanol.
[b] Hygroscopic product.

We claim:
1. A compound selected from the group consisting of (1) a compound of the formula

$$R-\underset{\underset{OR_1}{|}}{CH}-CH_2-N\diagup\diagdown N-CH_3$$

in which R is phenoxymethylene; phenoxymethylene which is substituted in the ring with cyclopentyl, cyclohexyl, 2 or 3 chlorine atoms or 2 chlorine atoms and nitro; or phenyl substituted with cyclopentyl, cyclohexyl or 2 chlorine atoms and nitro; and R₁ is benzoyl; benzoyl substituted with 1, 2 or 3 chlorine atoms or 2 chlorine atoms and nitro; phenoxyacetyl; phenoxyacetyl substituted in the ring with 1, 2 or 3 chlorine atoms or 2 chlorine atoms and nitro and (2) a pharmaceutically acceptable acid addition salt thereof.

2. A compound as claimed in claim 1 which is an addition salt with hydrochloric, sulphuric, phosphoric or citric acid.

References Cited
UNITED STATES PATENTS
2,928,834  3/1960  Shapiro et al. _____ 260—268

NICHOLAS S. RIZZO, Primary Examiner
R. V. RUSH, Assistant Examiner

U.S. CL. X.R.
260—999